(No Model.) 2 Sheets—Sheet 1.

L. T. SHEFFIELD.
ARTIFICIAL DENTURE.

No. 318,579. Patented May 26, 1885.

Witnesses:
Wm. F. Ayers
J. E. Hansmann

Inventor:
Lucius T. Sheffield,
By Foster & Freeman
Attorneys.

(No Model.) 2 Sheets—Sheet 2.

L. T. SHEFFIELD.
ARTIFICIAL DENTURE.

No. 318,579. Patented May 26, 1885.

UNITED STATES PATENT OFFICE.

LUCIUS T. SHEFFIELD, OF NEW YORK, N. Y.

ARTIFICIAL DENTURE.

SPECIFICATION forming part of Letters Patent No. 318,579, dated May 26, 1885.

Application filed August 12, 1884. (No model.)

*To all whom it may concern:*

Be it known that I, LUCIUS T. SHEFFIELD, a citizen of the United States, and a resident of the city, county, and State of New York, have invented certain new and useful Improvements in the Mode of Making Artificial Dentures, of which the following is a specification.

My invention has for its object to facilitate the manufacture of artificial teeth by securing a proper articulation of the teeth of the artificial denture with those of the opposite jaw; and this object I effect by the use of a trial-plate upon which the teeth are mounted and adjusted in the mouth prior to being connected together, as fully set forth hereinafter.

Figure 1:
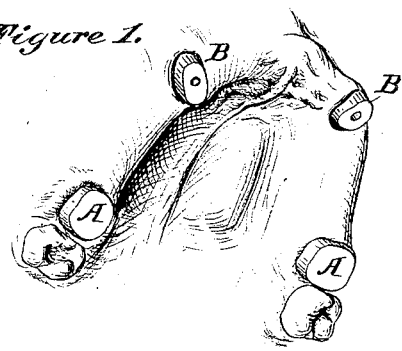
Figure 2:
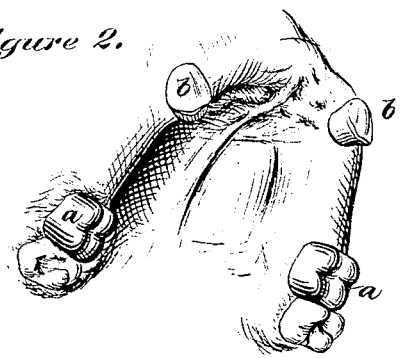
Figure 3:
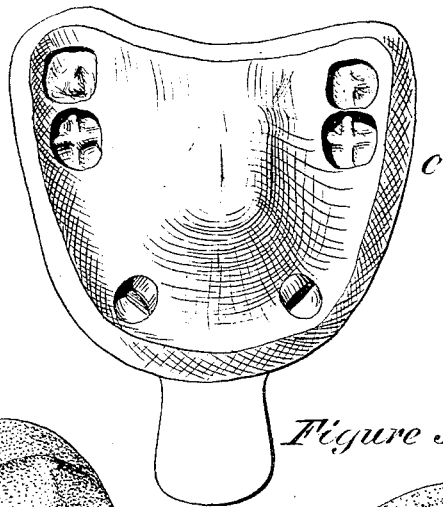
Figure 4:
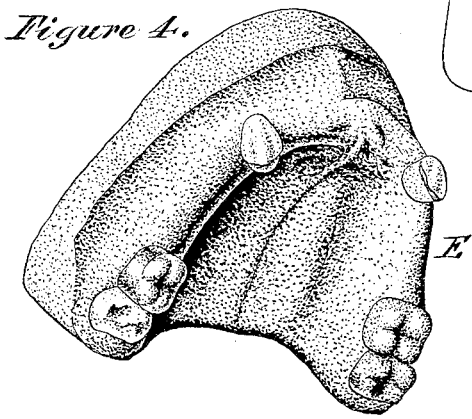
Figure 5:
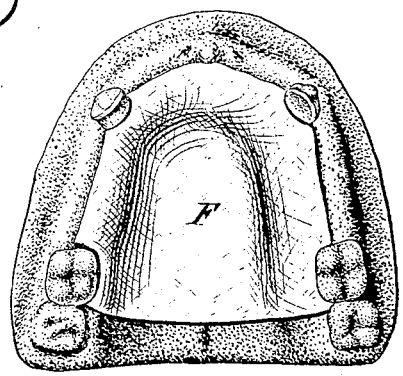
Figure 6:
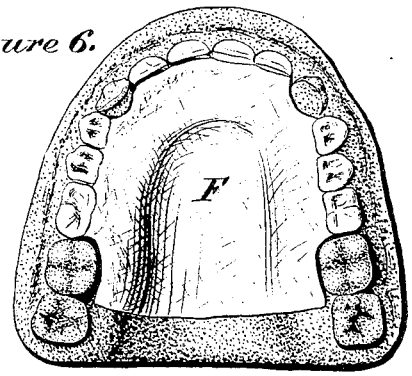
Figure 7:
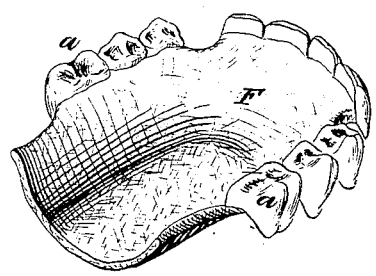
Figure 9:
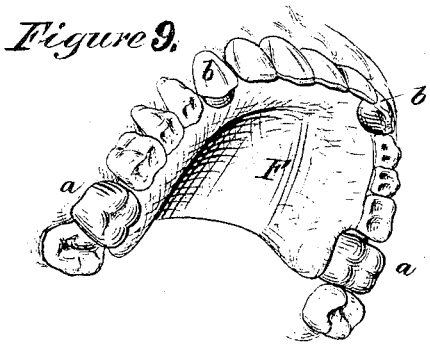
Figure 8:
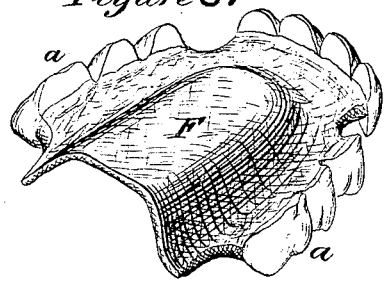
Figure 10:
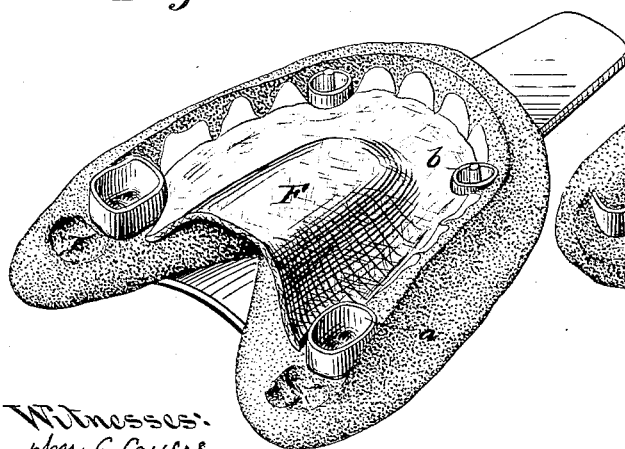
Figure 11:
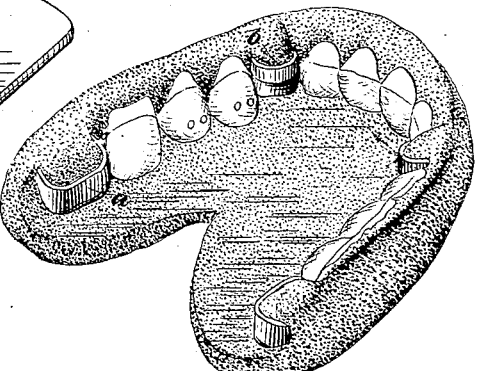

In the drawings, Figure 1 represents the natural mouth with the teeth and roots prepared to receive the artificial denture; Fig. 2, the same with the supporting crowns and teeth applied in position. Fig. 3 represents the matrix or impression, preferably of wax, taken from the mouth; Fig. 4, a cast of said matrix, the supporting porcelain teeth or crowns being here represented in plaster. Fig. 5 represents the trial-plate, properly fitted to the model of plaster. Fig. 6 illustrates the mounting of the teeth upon the trial-plate. Figs. 7 and 8 being respectively upper and lower perspective views of the trial-plate and teeth attached. Fig. 9 illustrates the trial-plate and teeth inserted in the mouth; Fig. 10, the same, together with the attaching crowns, removed from the mouth in an impression or matrix of investment material; Fig. 11, trial-plate and crown removed from impression-cup and properly inverted for soldering.

The teeth and roots are first properly prepared for the reception of metallic crowns and cap-pieces with their artificial teeth. As shown in Fig. 1, there are two molar teeth, A A, and two roots, B B, these constituting the supports for the denture, Fig. 2 showing the crowns *a a* upon the molars and the supporting-teeth *b b* in their position upon the roots.

An impression of the mouth, with the crowns and supporting-teeth in position, is taken in wax or other material, forming a matrix, C. (Shown in Fig. 3.) The crowns and supporting-teeth remaining embedded in the wax are removed from the impression and replaced in position in the mouth, and plaster is poured into this matrix, forming a mold or cast, E, which is an exact representation of the mouth, and a representation of the supporting crowns and teeth in position, as shown in Fig. 4. A sheet of wax, gutta-percha, or other plastic material is applied to the cast E, so as to cover that portion representing the roof of the mouth extending to the center of the ridge of alveolar process and to the cervical margins of the crown, as at F, Fig. 5. The dummy crowns, which form the bridge, are now waxed in position to the trial-plate F, formed by the sheet of wax, while it is upon the model, as shown in Fig. 6, and the latter is removed from the cast, presenting the appearance shown in Figs. 7 and 8. The trial-plate, with the teeth upon it, is now placed in position in the mouth of the patient. The supporting teeth and crowns having been properly placed in position on their respective roots and teeth, the dummy teeth, which form the bridge, are made to carefully articulate with those of the opposite jaw. After the teeth are in proper position they are, together with the trial-plate, waxed firmly to the supporting teeth or crowns in the mouth, and a second impression, as shown in Fig. 9, of the whole mouth, including the supporting crowns and teeth, trial-plate, and artificial teeth is taken in investment material and inverted, as shown in Fig. 11. The impression of investment material is now removed from the mouth, and the trial-plate and the wax are removed from the teeth and crowns, and the central portion of the cast is cut away, so as to expose the backs of the teeth and crowns. The teeth, trial-plate, crowns, and impression of investment material are removed from the impression-cup and carefully inverted for soldering, as shown in Fig. 11. Another means of accomplishing the removal and soldering of the teeth and supporting-crowns is to take an impression in pure plaster of teeth-supporting crowns and trial-plate, removing the same from the mouth, pouring investment material into this matrix of the jaw, cutting away plaster impression from the opposite side, inverting, and soldering.

I claim—

1. The within-described improvement in manufacturing artificial dentures, the same consisting in, first, forming a trial-plate of wax or equivalent material fitted to the mouth, applying the said plate to the mouth and mounting the artificial teeth thereon in proper articulation with the teeth of the other jaw, then investing the teeth and trial-plate and supporting-crowns in investment material, removing the plate, and connecting the teeth together, substantially as set forth.

2. In the manufacture of artificial teeth, fitting the supporting tooth-crowns to the roots and teeth in the mouth, preparing a cast thereof, making a mold from said cast representing the jaw, preparing a trial-plate of wax, fitting the said mold, mounting thereupon the artificial teeth which are to form the bridge, adjusting said artificial teeth upon said trial-plate by placing the said trial-plate in the mouth fitted with the supporting-teeth, thereby securing a proper articulation, and then investing the said bridge-teeth and the said supporting-teeth, together with the trial-plate, in the mouth and removing them together, substantially as described.

3. In the manufacture of artificial teeth, fitting the supporting tooth-crowns to the roots and teeth in the mouth, preparing a cast thereof, making a mold from said cast representing the jaw, preparing a trial-plate of wax, fitting the said mold, mounting thereupon the artificial teeth which are to form the bridge, adjusting said artificial teeth upon said trial-plate by placing the said trial-plate in the mouth fitted with the supporting-teeth, thereby securing a proper articulation, and then investing the said bridge-teeth and the said supporting-teeth, together with the trial-plate, in the mouth and removing them together, removing the wax, additionally investing the teeth sufficient to keep them in their relative positions, and then soldering the denture together, making a completed whole, substantially as described.

4. The within-described improvement in manufacturing artificial dentures, the same consisting in forming a model of the mouth in plaster representing the supporting-teeth or crowns in position, and adjusting thereto a temporary trial-plate of proper material, to which are attached the crowns and the dummy artificial teeth which form the bridge, for the purpose of obtaining a perfect articulation of the teeth of the opposite jaw without grinding, substantially as set forth.

In testimony whereof I have signed my name to this specification in the presence of two subscribing witnesses.

LUCIUS T. SHEFFIELD.

Witnesses:
GEO. H. EVANS,
F. L. FREEMAN.